United States Patent [19]

Davis

[11] 4,254,898
[45] Mar. 10, 1981

[54] PARTICLE SPACING AND METERING DEVICE

[75] Inventor: John G. Davis, Macalister, Australia

[73] Assignees: Owen Michael Davis, Macalister; Henry Lincoln Davis, Toowomba, both of Australia

[21] Appl. No.: 99,828

[22] Filed: Dec. 3, 1979

[51] Int. Cl.³ ............................................. G01F 11/00
[52] U.S. Cl. .................................... 222/263; 222/290; 222/317
[58] Field of Search ............... 222/290, 310, 311, 312, 222/263, 313, 317, 267, 268, 270, 282, 281, 272, 412, 414; 221/277, 224

[56] References Cited

U.S. PATENT DOCUMENTS

| 353,727 | 12/1886 | Woodbury | 222/281 |
| 3,637,112 | 1/1972 | Christy | 222/317 |
| 3,912,122 | 10/1975 | Knapp | 222/272 |
| 3,913,798 | 10/1975 | Allen | 222/281 |

Primary Examiner—Allen N. Knowles
Attorney, Agent, or Firm—D. Paul Weaver

[57] ABSTRACT

A particle spacing and metering device having a supply hopper above a pair of contra-rotating rollers. An aperture in the floor of the hopper is provided with a regulator which controls the flow of particles to the rollers. The regulator has a body fixed to a shaft rotatably mounted in the aperture. A cam-type metering face has a groove of increasing depth and width to enable selected variation of a throat through which the particles flow.

7 Claims, 4 Drawing Figures

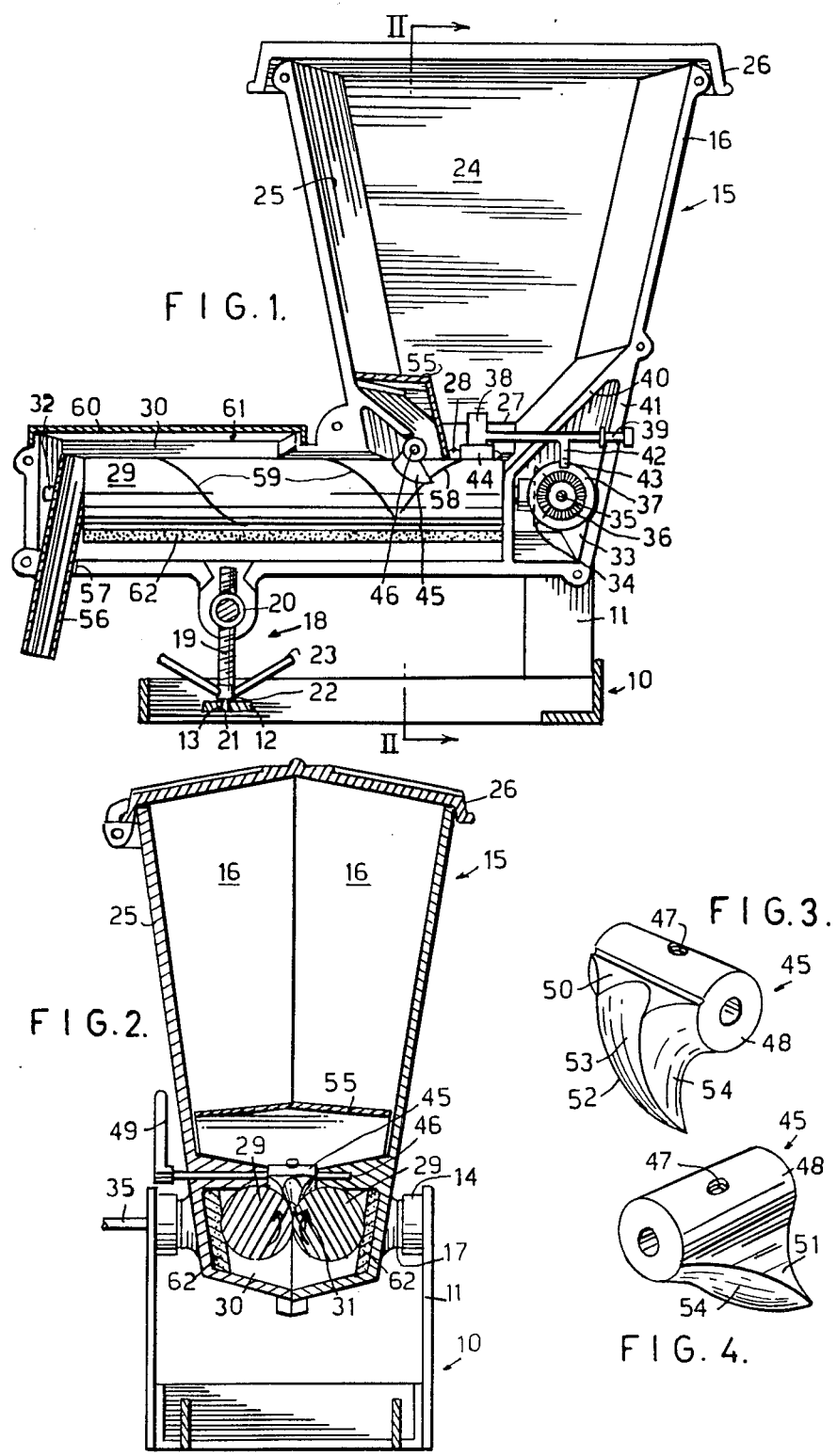

PARTICLE SPACING AND METERING DEVICE

BACKGROUND OF THE INVENTION

This invention relates to an improved particle spacing and metering device and is particularly directed to such a device for separating and metering granular substances composed of substantially uniform particles which are to be uniformly metered at various desired rates from a bulk supply.

There are several applications for such a spacing and metering device, e.g. (a) separating and metering pills for accurate electronic counting; (b) separating and metering manufactured components (e.g. ball bearings) for accurate counting and feeding to assembly machines; and (c) metering plant seeds accurately for sowing.

The third application above is particularly important in the sowing of crops such as sorghum and sunflowers where the seeds must be sown at regular spaced intervals. To the present, known seed planters have not provided the accuracy of metering the wide variety of seed sizes required.

BRIEF SUMMARY OF THE INVENTION

In the broad aspect, the invention resides in a particle spacing and metering device including:
a supply hopper,
a floor in the hopper,
an aperture in the floor,
at least two contra-rotating rollers underlying the aperture and sealably engaging the underside of the floor,
a shaft rotatably mounted in the aperture,
a regulator fixedly mounted on the shaft, said regulator being configured to closely overlie the valley formed between the rollers in a first position,
a throat formed by the rollers and the regulator, the regulator being movable to vary the size of the throat and the flow of particles therethrough,
wherein the improvement comprises:
the regulator having a groove of simultaneously increasing depth and width along the regulator adapted to allow an increasing quantity of particles to flow through the aperture onto the rollers as the regulator is rotated from a first position where said throat is of minimum size to a second position where said throat is of maximum size.

The rollers may just touch or be slightly spaced, the spacing being preferably, much less than the size of the particles. Preferably the surfaces of the rollers are brushed by graphite-impregnated pads to maintain the surfaces in a slippery condition.

The rollers may be parallel or tapered and their surfaces may have grooves, flutes, holes or small protrusions thereon to assist in controlling the flow of the particles.

BRIEF DESCRIPTION OF SEVERAL VIEWS OF THE DRAWINGS

To enable the invention to be fully understood, a preferred embodiment will now be described with reference to the accompanying drawings, in which:

FIG. 1 is a side sectional view of one embodiment of the invention;

FIG. 2 is a front sectional view taken on line II—II of FIG. 1;

FIG. 3 is one perspective view of the metering regulator used in this embodiment; and FIG. 4 is a second perspective view of the metering regulator.

DETAILED DESCRIPTION OF THE PREFERRED EMBODIMENT OF THE INVENTION

The base 10 is substantially rectangular plan and has a pair of vertical uprights 11 at one end, and an intermediate cross-bar 12 with central aperture 13 therethrough. Opposed concentric sockets 14 are welded to the upper ends of the uprights 11 and are adapted to receive and support the body of the metering device (to be described). Aligned holes are formed in the sockets 14.

The body 15, which is substantially L-shape in side view, is formed of two mirror-image body portions 16 which are bolted or welded together. Each body portion 16 has a horizontal bearing block 17 at the lower rear corner thereof which is rotatably journalled in one of the sockets 14.

A screw jack 18 has a threaded shaft 19 which is threadably received by a block 20 pivotally mounted intermediate the length of the body portions 16. The lower portion 21 of the shaft 20 is of a reduced diameter and is journalled in aperture 13 in the cross-bar 12. An intermediate bearing face 22 connects the upper and lower portions of the threaded shaft 19 and engages the upper face of the cross bar 12. A pair of handles 23 extend laterally from the shaft 19. By rotation of the shaft 19 via handles 23, the forward end of the body 15 may be raised and lowered relative to the frame 10, the rear of the body pivoting in the sockets 14, to adjust the relative inclination of the body 15 to the horizontal. The body 15 has a supply hopper 24 with inwardly-sloping walls 25, a pivotal lid 26 (which sealably engages the upper rim of the hopper) and a floor 27, the floor having an aperture 28 (substantially rectangular in plan) therethrough.

A pair of contra-rotating rollers 29 are provided in the roller compartment 30 forming the "foot" of the body 15, the upstream ends of the rollers 29 underlying the aperture 28 and in sealing engagement with the underside of the hopper floor 27 on three sides of the aperture 28, the downstream side being spaced from the roller 29 to form a modified V-shape throat 31. The rollers 29 are cylindrical and are supported by parallel shafts 32 journalled in bearings (not shown) in the end walls of the roller compartment 30. The outer surfaces of the rollers 29 may be in rubbing contact or may be slightly spaced, the maximum spacing being not more than 50% of the minimum dimension of the particles to be metered and spaced.

Each shaft 32 extends into the gearbox 33 and is fitted with a bevel gear 34 secured thereto by a grub screw (not shown). A drive shaft 35 is journalled in bushes (not shown) in the bearing blocks 17 and is connected to a suitable power source e.g. a motor or a ground engaging wheel (not shown). Bevel gears 36 on the drive shaft 35 are meshed with the respective bevel gear 34 on the roller shaft 32 to contra-rotate the rollers 29.

A wobble plate 37 is secured to the drive shaft 35, between the bevel gears 36. An agitator plate 38 has its shaft 39 journalled in respective apertures in the wall 40 dividing the hopper 24 from the gearbox 33 and in the rear wall 41 of the gearbox. A finger 42 extends downwardly from the shaft 39 and the rim of the wobble plate 37 runs through a groove 43 in the lower end of the finger. As the wobble plate 37 rotates, finger 42 is reciprocated transversely to the gearbox 33 and the agitator plate 38 moves in unison therewith. A flexible extension 44 on the agitator plate 38 moves across the rollers 29 in the aperture 28 to continually agitate any particles on or adjacent the rollers without damage to seed or particles.

A regulator 45, shown in greater detail in FIGS. 3 and 4, is fixed on a shaft 46, pivotally mounted across the downsteam end of the aperture, by grub screws (not shown) which are screwed into holes 47 in the body 48 of the regulator. The shaft 46 extends through the wall of the body 15 and is provided with an operating handle 49 which is moved over a graduated scale (not shown) on the outer surface of the wall 25 of the hopper 24. This scale indicates the relative position of the regulator 45 to the rollers 29 and thereby, the relative size of the throat 31.

As shown in FIGS. 3 and 4, the metering section of the regulator has a front face 50 and a rear face 51 both substantially radial to the body and at a normal to each other. The metering face 52 is of increasing radius in the direction from the front face 50 to the rear face 51. A groove 53 in the metering face 52 has its maximum width and depth at the front face 50 and the width and depth is smoothly reduced towards a minimum at the rear face 51. A pair of smooth sided scalloped side walls 54 delineate the sides of the metering section and the side walls 54 are adapted to have their portions adjacent to the rollers 29 in contact with, or lying close to, the rollers in the range of angular positions of the regulator 45. As the regulator 45 is rotated (in a anti-clockwise direction in FIG. 1) between the closed position to the open position, the width and depth of the groove 53 over the rollers 29 increases, thereby increasing the cross-sectional area of the throat 31.

A throat control cover 55 is fixed to the front wall and the wide walls of the hopper 24, and overlies the regulator 45 to support the particles above and away from the regulator.

A drop tube 56 is fixed to the two body portions 16 by a suitable stud and lies in a suitably dimensional aperture 57 through the base wall of the roller compartment 30. Particles conveyed down the rollers 29 fall into the drop tube and are conveyed e.g. to a seed planter or particle counter.

Each roller 29 has a pair of plates 58 on the outer surface thereof along the portion under the aperture 29. The flutes 58 are of reverse hand to the rotation of the rollers to agitate the particles in the aperture, and to bring them more rapidly into single file as they pass through the throat 31.

Secondly spiral flutes 59 are provided along the remainder of the rollers 29 to assist the particles in forming a single line as they move down the rollers 29 towards the drop tube 56.

To enable the operator to watch the flow of the particles down the rollers 29, a clear perspex cover 60 is fitted over aperture 61 in the top wall of the roller compartment 30. Graphite (or like lubricant) impregnated pads 62 are fitted in the roller compartment 30 in rubbing contact with the rollers 20 to maintain the outer surfaces of the rollers smooth and slippery to assist the particle flow.

In operation, the operator adjusts the screw jack 18 to set the rollers 29 at the required inclination to the horizontal, as indicated by an inclinometer. The steeper the angle, the faster the particle flow rate.

The drive shaft 35 is driven by the power source to rotate the rollers 29. The operator watches the flow of particles down the rollers through the perspex cover 60 and rotates the shaft 46 via handle 49 to set the regulator 45 at the required position so that the throat 31 allows the required size and rate of flow of particles to move along the rollers 29 and be dropped into the drop tube 56.

Depending on the size of the particles being metered and spaced, a greater throat opening may be required for a given flow rate.

The rate of particle flow may be varied by:
 (1) the angle of inclination of the rollers to the horizontal;
 (2) the rotational speed of the rollers; or
 (3) the cross-sectional area of the throat.

By increasing any one of these factors, alone or in combination, the flow rate will be increased.

The rollers 29 may be modified by eliminating the secondary spiral flutes 59. The rollers may be left plain, have longitudinal grooves (to increase the particle flow rate), transverse flutes (to reduce the particle flow rate) or may e.g. have one roller with a longitudinal flute and the other with a transverse flute. Increasing the depth and/or width of the flutes increases the disturbance of the particles and can encourage single file formation. Whilst cylindrical rollers have been described and illustrated, tapered rollers may be used. Alternatively, the cylindrical rollers may have a small taper adjacent the drop tube 56 to more accurately direct the particles into the tube.

The rollers may be manufactured from steel and may, if preferred, have a plastic outer sheath.

The rollers may be operated in the range of 80–120 r.p.m., with a preferred speed of 100 r.p.m.

As an alternative to the regulator 45, the control means may include a strip of rubber or like elastomeric material across the downstream end of the aperture 29, the lower edge of the strip and the rollers 29 forming the throat 31. A movable finger, fixed on a shaft mounted in the aperture, in the same manner as the regulator shaft 46, engages the strip and moves the lower edge thereof towards or away from the rollers to vary the cross-sectional area of the throat 31 and thereby the particle flow rate.

The graphite impregnated pads 62 are not necessary if the rollers are manufactured from steel but are required if the rollers have a plastic sheath to reduce the static electricity on the surface of the rollers, which can carry the particles out of the valley between the rollers and over the sides of the rollers to fall into the base of the roller compartment 30. With most seeds, experiments have shown that the most satisfactory flow is achieved with small angle of inclination of the rollers to the horizontal e.g. in the range 0°–15°.

The advantage of the present invention over known devices can be summarized as follows:
 (1) it can evenly meter out particles having a wide range of sizes without the need to change or modify any parts or any ancillary equipment;
 (2) it can provide an infinitely variable rate of particle flow (within practical limits) by adjustment of one or more of the following factors of roller inclination, roller speed and throat opening;
 (3) it consumes relatively little power to drive, having no high speed moving parts;

(4) it employs a simple drive mechanism;

(5) it is rugged, simple to operate and cheap to maintain; and (6) it is highly versatile as it can be used for spacing and metering seeds and grains, ball bearings, pills and capsules, for example.

Various changes and modifications may be made to the arrangement described without departing from the scope of the present invention.

I claim:

1. A particle spacing and metering device including:
a supply hopper;
a floor in the hopper;
an aperture in the floor;
at least two contra-rotating rollers underlying the aperture and sealably engaging the underside of the floor;
a shaft rotatably mounted in aperture;
a regulator fixedly mounted on the shaft, said regulator being configured to closely overlie the valley formed between the rollers in a first position;
a throat formed by the rollers and the regulator, the regulator being movable to vary the size of the throat and the flow of particles therethrough;
wherein the improvement comprises:
the regulator having a groove of simultaneously increasing depth and width along the regulator adapted to allow an increasing quantity of particles to flow through the aperture onto the rollers as the regulator is rotated from a first position where said throat is of minimum size to a second position where said throat is of maximum size.

2. A device as claimed in claim 1 wherein the regulator further comprises:
a cylindrical body securely mounted on the shaft; and
a metering section extending laterally from the body, said metering section including:
a front face extending radially from the body;
a rear face extending radially from the body and substantially at a normal to the front face; and
a metering face connecting the free ends of said front face and said rear face, said metering face being of increasing radius in the direction of the rear face.

3. A device as claimed in claim 2 wherein:
said groove is formed in said metering face and is of maximum depth and width at said front face.

4. A device as claimed in claim 2 and wherein the metering section further includes:
a pair of scalloped concave side faces adapted to be in contact with or adjacent to, the rollers as the regulator is moved between said first position and said second position.

5. A device as claimed in claim 1 and further comprising:
a throat control cover in the hopper adapted to support particles above the regulator at said throat.

6. A device as claimed in claim 1 wherein:
the outer surfaces of the rollers are spaced apart a distance not greater than 50% of the smallest dimension of the particles.

7. A device as claimed in claim 1 and further comprising:
graphite impregnated pads brushing the outer surfaces of the rollers to maintain said surfaces in a slippery condition.

* * * * *